(12) United States Patent
Olson

(10) Patent No.: US 6,370,971 B1
(45) Date of Patent: Apr. 16, 2002

(54) PULLEY HUB LOAD CELL

(75) Inventor: Quenton Olson, Chatsworth, CA (US)

(73) Assignee: Tedea-Huntleigh, Inc., Chatsworth, CA (US)

( * ) Notice: Subject to any disclaimer, the term of this patent is extended or adjusted under 35 U.S.C. 154(b) by 0 days.

(21) Appl. No.: 09/694,752

(22) Filed: Oct. 23, 2000

(51) Int. Cl.$^7$ ................................................ G01L 1/04
(52) U.S. Cl. ................................................ 73/862.634
(58) Field of Search .......................... 73/760, 768, 781, 73/790, 796, 795, 841, 862, 862.634, 862.639

(56) References Cited

U.S. PATENT DOCUMENTS

| | | |
|---|---|---|
| 3,826,631 A | 7/1974 | Rigney et al. |
| 4,118,012 A | 10/1978 | Kerr et al. |
| 4,581,947 A | 4/1986 | Wulf et al. |
| 4,939,936 A | 7/1990 | Spooner et al. |
| 4,972,711 A * | 11/1990 | Jain et al. .................. 73/379 |
| 5,353,692 A * | 10/1994 | Dow et al. ............. 128/662.06 |
| 5,479,831 A | 1/1996 | Hirose |
| 5,831,222 A * | 11/1998 | Fanger et al. ............... 177/147 |
| 5,970,906 A | 10/1999 | Hrescak et al. |
| 6,216,547 B1 * | 4/2001 | Lehtovaar .............. 73/862.391 |

* cited by examiner

*Primary Examiner*—Max Noori
(74) *Attorney, Agent, or Firm*—Thomas I. Rozsa; Tony D. Chen; Jerry Fong

(57) ABSTRACT

A pulley hub load cell assembled inside a hub opening of a pulley between a rolling element part and a pulley axle. The load cell has a body adapted to be placed inside the rolling element part and having an interior bore for insertion through the pulley axle. The body has at least one exterior location to be brought into contact with the rolling element part, and at least one interior location to be brought into contact with the pulley axle. The at least one exterior location and the at least one interior location of the body are spaced apart and offset such that a portion of the body there-between forms a cantilever configuration which is deformable when counter-loads are applied to the at least one exterior location and the at least one interior location of the body from the rolling element part and the pulley axle respectively. The pulley hub load cell further includes a strain gauge element affixed to the cantilever portion of the body for producing a load sensing signal in proportion to the counter-loads applied to the body.

27 Claims, 3 Drawing Sheets

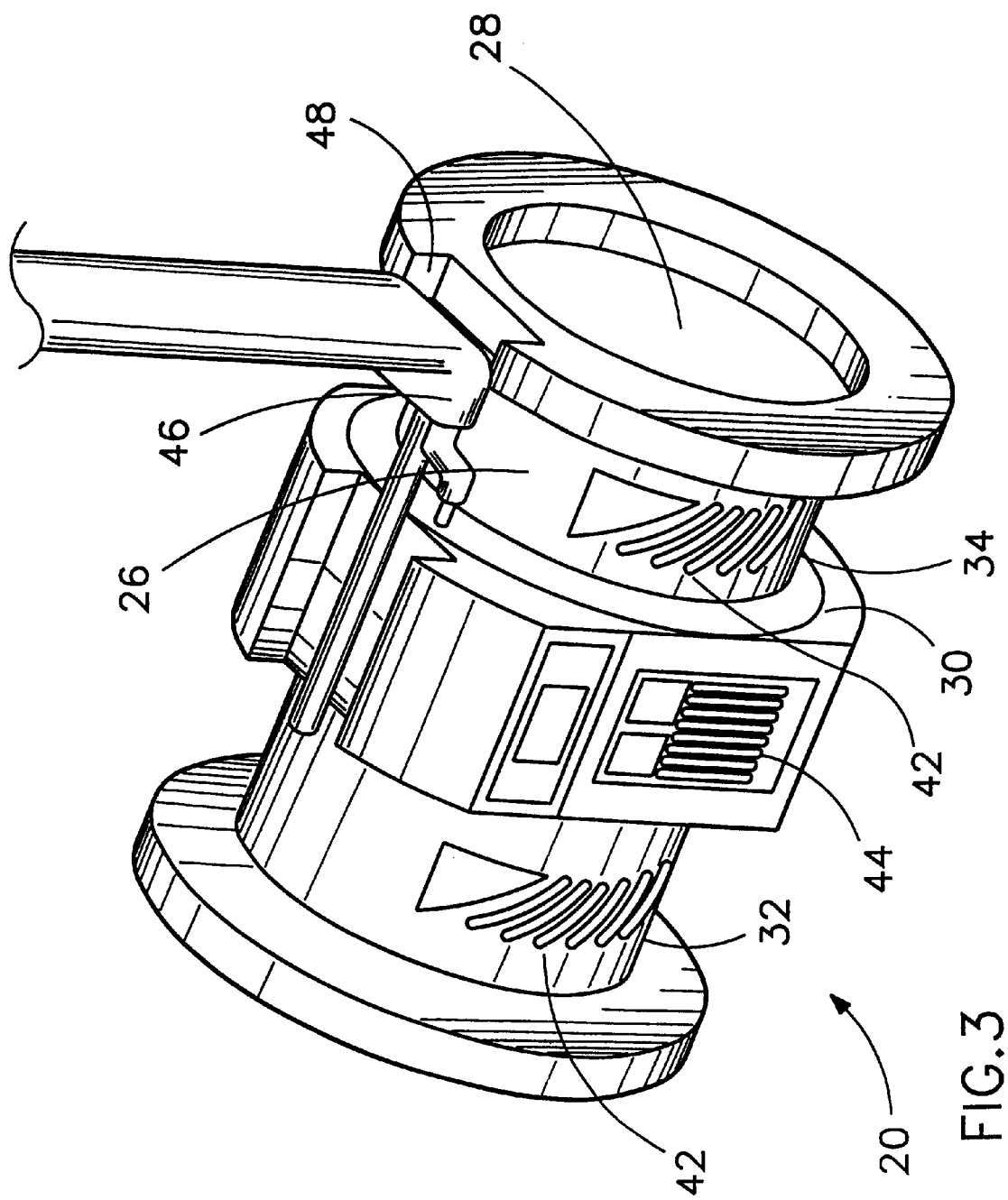

PULLEY HUB LOAD CELL

BACKGROUND OF THE INVENTION

1. Field of the Invention

The present invention relates to the field of load measuring devices. More particularly, the present invention relates to the field of load measuring devices incorporated within other mechanical apparatus.

2. Description of the Prior Art

Load measuring devices have been introduced in the past years. The following patents are found to be pertinent to the field of the present invention:

1. U.S. Pat. No. 3,826,321 issued to Rigney et al. on Jul. 30, 1974 for "Load Weighing System For Cranes With Rotatable Booms" (hereafter "Rigney");
2. U.S. Pat. No. 4,118,012 issued to Kerr et al. on Oct. 3, 1978 for "Load Transfer" (hereafter "Kerr");
3. U.S. Pat. No. 4,581,947 issued to Wulf et al. on Apr. 15, 1986 for "Linear Force Measurement Apparatus Or Device" (hereafter "Wulf"),
4. U.S. Pat. No. 4,939,936 issued to Spooner et al. on Jul. 10, 1990 for "Shapemeter" (hereafter "Spooner");
5. U.S. Pat. No. 4,958,525 issued to Hauer et al. on Sep. 25, 1990 for "Web Tension Measuring Assembly" (hereafter "Hauer");
6. U.S. Pat. No. 5,479,831 issued to Hirose on Jan. 2, 1996 for "Fishline Tension Measuring Device For Fishing Reel" (hereafter "Hirose"); and
7. U.S. Pat. No. 5,970,906 issued to Hrescak et al. on Oct. 26, 1999 for "Motion Compensation Winch" (hereafter "Hrescak").

Rigney discloses a load weighing system for cranes with rotatable booms. The system uses a boom-mounted dynamometer whose output is an accurate indication of cable tension and therefore load weight. The dynamometer comprises a base plate on which are mounted spaced freely rotatable guide pulleys and an intermediate freely rotatable load cell assembly offset a slight amount from a line joining the centers of the pulleys. The main load lifting cable passes between the load cell assembly and the pulleys. The pulleys guide the cable as it passes through the dynamometer.

Kerr discloses a load transfer device. It includes pulley bearings which are designed to rest on load cells.

Wulf discloses a linear force measurement apparatus or device. It requires a separate and additional measuring ring supported by a support ring of the bearing assembly of a deflection roller over which the web passes. The measuring ring has a pair of slits cut into the ring having parallel rectilinear portions which are in a perpendicular direction of force application.

Spooner discloses a shapemeter. It includes strain gauges provided on webs of the shapemeter.

Hauer discloses a web tension measuring assembly. It requires a separate and additional measuring cage which includes a flanged ring fixed to a side frame of the printing machine and a retainer ring joined to a bearing for the measuring roller. These two rings are connected by a plurality of flectional beams that are provided with strain gauges. Changes in web tension are sensed by the strain gauges in response to deflection of the flectional beams.

Hirose discloses a fishline tension measuring device for a fishing reel. It include strain gauges mounted on a separate and additional bearing support member.

Hrescak discloses a motion compensation winch. It uses a measuring device to measure the tension on a cable.

In many applications there is a need to measure a load applied on a pulley. However, it is desirable to have an in-line measuring device built into or replacing the hub of the pulley for measuring the load, without using additional separate mounting or supporting members for the measuring device.

Therefore, it is desirable to provide a new in-line pulley hub load measuring device which is built into or replaces the hub of the pulley for measuring the load applied on the pulley without adding separate auxiliary members.

SUMMARY OF THE INVENTION

The present invention is a novel and unique pulley hub load cell. It is an in-line pulley hub load measuring device which is built into or replaces the hub of the pulley for measuring the load applied on the pulley without adding separate auxiliary members.

It is an object of the present invention to provide a measuring device to measure the load applied on a pulley.

It is also an object of the present invention to provide an in-line load cell built into or replacing the pulley hub of a pulley for measuring the load applied on the pulley.

It is an additional object of the present invention to provide a pulley hub load cell that does not require any additional separate auxiliary member for mounting or supporting the load cell.

It is a further object of the present invention to provide a pulley hub load cell to sense either the shear strain or bending strain exerted on the measuring device.

Described generally, the present invention is a pulley hub load cell assembled inside a hub opening of a pulley between a rolling element part and a pulley axle. The present invention pulley hub load cell has a generally cylindrical shaped body adapted to be placed inside the rolling element part and having an interior bore with two opposite ends for insertion through the pulley axle, and two generally cylindrical sleeve shaped covers for protecting the generally cylindrical shaped body.

The generally cylindrical shaped body of the load cell has an exterior central section to be brought into contact with the rolling element part, and two interior flanges at the two opposite ends of the interior bore of the body respectively to be brought into contact with the pulley axle, forming a cantilever configuration which is deformable when counter-loads are applied to the central section and the interior flanges of the body from the rolling element part and the pulley axle respectively.

The pulley hub load cell is further provided with at least one strain gauge and electronic circuitry element affixed to the body between the central section and one of the two opposite ends of the body for producing and outputting a load sensing signal in proportion to the counter-loads applied to the body.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a lengthwise cross-sectional view of the load sensor body of the present invention pulley hub load cell.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
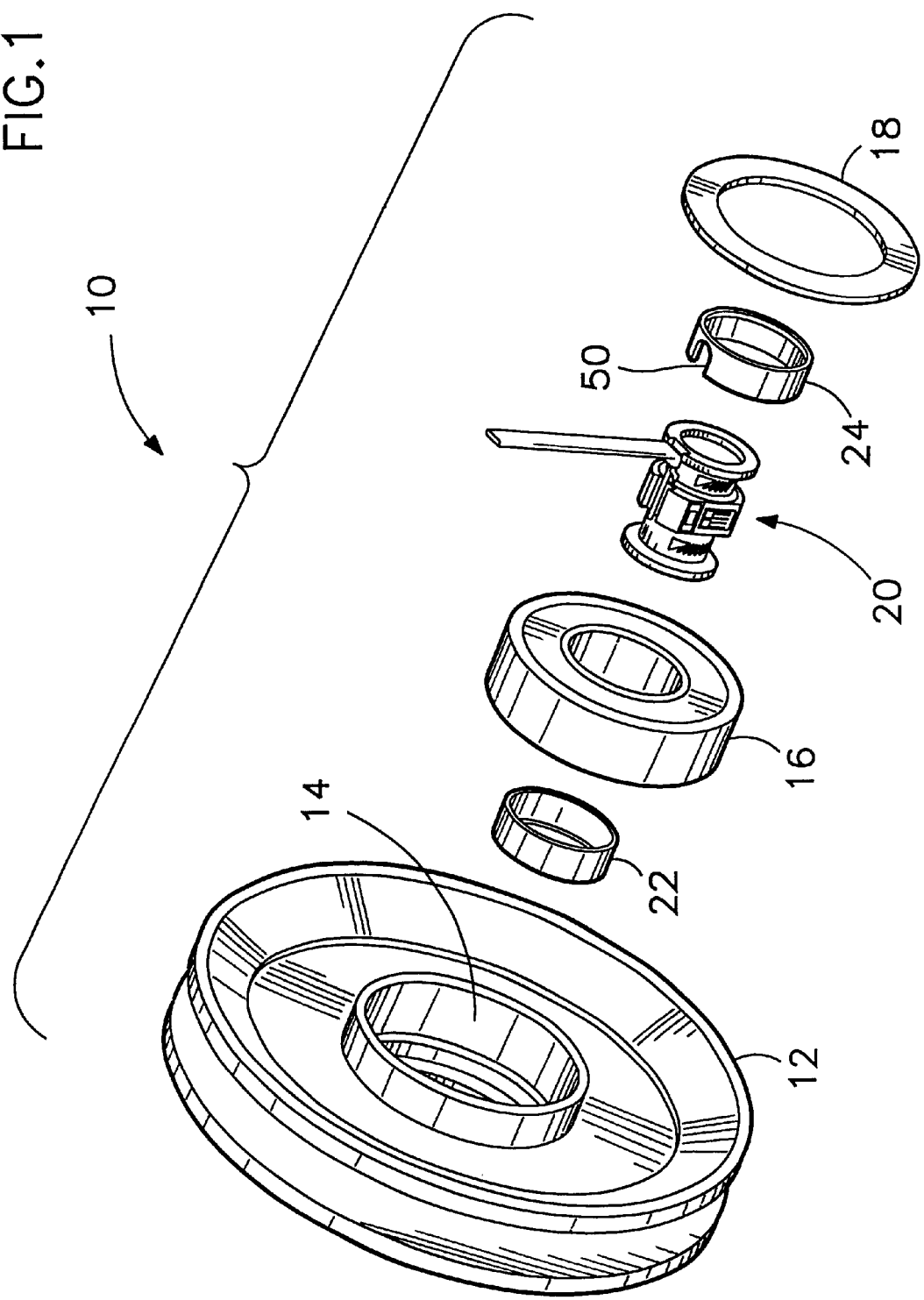
FIG. 1 is an exploded perspective view showing the pulley hub load cell of the present invention.

Referring to FIG. 1, there is shown a pulley hub load cell assembly 10. The pulley hub load cell assembly 10 includes a pulley 12. Pulley 12 can be of any suitable conventional design and construction and typically has a central opening 14 for assembling therein a rolling element bearing or bushing 16 covered by a bearing cover 18 for protection from outside dust and other environmental hazards. The rolling element bearing or bushing 16 and cover 18 may be of any suitable conventional design and construction.

Figure 2:
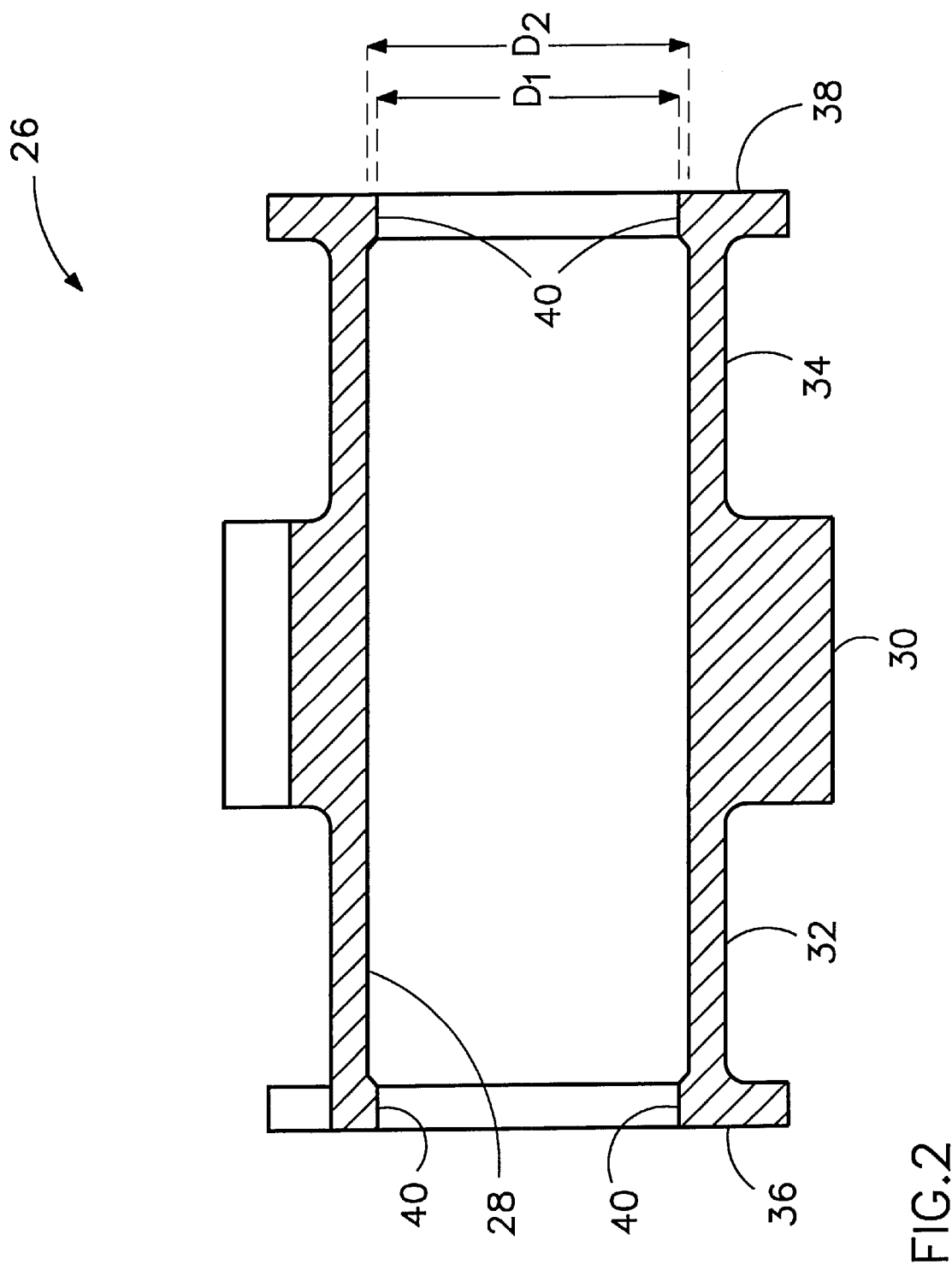
FIG. 2 is an enlarged perspective view showing the load sensor element of the present invention pulley hub load cell.

The present invention pulley hub load cell assembly 10 further includes a load sensor element 20 and a pair of generally cylindrical sleeve shaped sensor covers 22 and 24. Referring to FIGS. 2 and 3, load sensor element 20 has a generally hollow cylindrical shaped body 26 with an interior through bore 28 for insertion through a pulley axle (not shown).

The load sensor body 26 also has a central section 30 and two exterior grooves 32 and 34, one on each side of the central section 30. At each of the two opposite ends 36 and 38 of the load cell body 26, there is an interior end flange 40 which has an inside diameter $D_1$ slightly smaller than the inside diameter $D_2$ of the remaining major portion of the interior through bore 28 of the load sensor body 26.

When the load cell sensor assembly is assembled, the rolling element bearing or bushing 16 comes into contact with the exterior surface of the central section 30 of the load sensor body 26, and the pulley axle (not shown) comes into contact with the interior end flange 40 of the interior through bore 28 of the load sensor body 26 but not with the central section 30 of the load sensor body 26. From the cross-sectional view of FIG. 3 it can be seen that this forms a cantilever configuration with a reduced thickness between the central section 30 and each end flange 40 of the interior through bore 28 of the load sensor body 26. When counter-loads are applied on the central section 30 (by rolling element bearing or bushing 16) and the end flanges 40 (by pulley axle) of the load sensor body 26, this cantilever portion between the central section 30 and each end flange 40 of the interior through bore 28 of the load sensor body 26 will be caused to deform.

The load sensor element 20 further includes strain gauges 42 such as bonded foil strain gauges adhered to the side grooves 32 and 34 of the load sensor body 26. When the load sensor body 26 deforms as a result of the counter loads applied, the strain gauges 42 will deform as well and produce a load sensing signal in proportion to the loads applied, for example, because of the change in resistance of the bonded foil strain gauges. Electronic circuitry 44 and electrical wiring 46 are also provided for processing and outputting the signal to a reading or displaying device (not shown). A slot opening 48 may be provided on the load sensor body 26 for passage of the wiring 46. A slot opening 50 may also be provided on one or both of the pair of sensor covers 22 and 24 for passage of the wiring 46.

The present invention has many advantages. The load cell is built into the pulley hub as an integral part for sensing the load applied to the pulley through cable, rope, string, etc., which is either partially or fully wrapped around or brought into contact with either the pulley or pulley axle. It can also be used with existing conventional pulleys without the need of modifying the pulley, the rolling element bearing or bushing, the pulley hub cover, or the pulley axle. In either case, no additional or separate component part is needed for mounting or supporting the load sensing element within the pulley hub. In addition, the strain gauges of the present invention pulley hub load cell are capable of sensing either shear strain or bending strain. Furthermore, the present invention pulley hub load cell is compact in design, easy to assemble, repair or replace.

Defined in detail, the present invention is a pulley mounted on a pulley axle and having load sensing capacity, comprising: (a) a pulley having a hub opening and a rolling element part installed therein; (b) a generally cylindrical shaped body adapted to be placed inside the rolling element part and having an interior bore with two opposite ends for insertion there-through the pulley axle; (c) a pair of generally cylindrical sleeve shaped covers for protecting the generally cylindrical shaped body; (d) the generally cylindrical shaped body having an exterior central section to be brought into contact with the rolling element part, and two interior flanges at the two opposite ends of the interior bore of the body respectively to be brought into contact with the pulley axle, forming a cantilever configuration which is deformable when counter-loads are applied to the central section and the interior flanges of the body from the rolling element part and the pulley axle respectively; (e) two outside grooves each located between the central section and a respective one of the two opposite ends of the interior bore of the body; (f) a plurality of strain gauges affixed to the outside grooves of the body for producing a load sensing signal in proportion to the counter-loads applied to the body; and (g) at least one electronic circuitry element affixed to the central section of the body for processing and outputting the load sensing signal.

Defined broadly, the present invention is a pulley hub load cell assembled inside a hub opening of a pulley between a rolling element part and a pulley axle, comprising: (a) a generally cylindrical shaped body adapted to be placed inside the rolling element part and having an interior bore with two opposite ends for insertion there-through the pulley axle; (b) at least one generally cylindrical sleeve shaped cover for protecting the generally cylindrical shaped body; (c) the generally cylindrical shaped body having an exterior central section to be brought into contact with the rolling element part, and two interior flanges at the two opposite ends of the interior bore of the body respectively to be brought into contact with the pulley axle, forming a cantilever configuration which is deformable when counter-loads are applied to the central section and the interior flanges of the body from the rolling element part and the pulley axle respectively; and (d) at least one strain gauge and electronic circuitry element affixed to the body between the central section and one of the two opposite ends of the interior bore of the body for producing and outputting a load sensing signal in proportion to the counter-loads applied to the body.

Defined more broadly, the present invention is a pulley hub load cell assembled inside a hub opening of a pulley between a rolling element part and a pulley axle, comprising: (a) a body adapted to be placed inside the rolling element part and having an interior bore for insertion there-through the pulley axle; (b) the body having at least one exterior location to be brought into contact with the rolling element part, and at least one interior location to be brought into contact with the pulley axle; (c) the at least one exterior location and the at least one interior location of the body being spaced apart and offset such that a portion of the body there-between forms a cantilever configuration which is deformable when counter-loads are applied to the at least one exterior location and the at least one interior location of the body from the rolling element part and the pulley axle respectively; and (d) a strain gauge element affixed to the cantilever portion of the body for producing a load sensing signal in proportion to the counter-loads applied to the body.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and for disclosure of an operative embodiment and not to show all of the various forms or modifications in which the present invention might be embodied or operated.

The present invention has been described in considerable detail in order to comply with the patent laws by providing fall public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A pulley mounted on a pulley axle and having load sensing capacity, comprising:
   a. a pulley having a hub opening and a rolling element part installed therein;
   b. a generally cylindrical shaped body adapted to be placed inside said rolling element part and having an interior bore with two opposite ends for insertion there-through said pulley axle;
   c. a pair of generally cylindrical sleeve shaped covers for protecting said generally cylindrical shaped body;
   d. said generally cylindrical shaped body having an exterior central section to be brought into contact with said rolling element part, and two interior flanges at said two opposite ends of said interior bore of said body respectively to be brought into contact with said pulley axle, forming a cantilever configuration which is deformable when counter-loads are applied to said central section and said interior flanges of said body from said rolling element part and said pulley axle respectively;
   e. two outside grooves each located between said central section and a respective one of said two opposite ends of said interior bore of said body;
   f. a plurality of strain gauges affixed to said outside grooves of said body for producing a load sensing signal in proportion to said counter-loads applied to said body; and
   g. at least one electronic circuitry element affixed to said central section of said body for processing and outputting said load sensing signal.

2. The pulley as defined in claim 1, wherein said plurality of strain gauges include bonded foil strain gauges.

3. The pulley as defined in claim 1, wherein said plurality of strain gauges are capable of sensing shear strain.

4. The pulley as defined in claim 1, wherein said plurality of strain gauges are capable of sensing bending strain.

5. The pulley as defined in claim 1, wherein said plurality of strain gauges are adhered to said body.

6. A pulley hub load cell assembled inside a hub opening of a pulley between a rolling element part and a pulley axle, comprising:
   a. a generally cylindrical shaped body adapted to be placed inside said rolling element part and having an interior bore with two opposite ends for insertion there-through said pulley axle;
   b. at least one generally cylindrical sleeve shaped cover for protecting said generally cylindrical shaped body;
   c. said generally cylindrical shaped body having an exterior central section to be brought into contact with said rolling element part, and two interior flanges at said two opposite ends of said interior bore of said body respectively to be brought into contact with said pulley axle, forming a cantilever configuration which is deformable when counter-loads are applied to said central section and said interior flanges of said body from said rolling element part and said pulley axle respectively; and
   d. at least one strain gauge and electronic circuitry element affixed to said body between said central section and one of said two opposite ends of said interior bore of said body for producing and outputting a load sensing signal in proportion to said counter-loads applied to said body.

7. The pulley hub load cell as defined in claim 6, wherein said generally cylindrical shaped body has at least one outside groove located between said central section and at least one of said two opposite ends of said interior bore of said body.

8. The pulley hub load cell as defined in claim 6, wherein said at least one strain gauge and electronic circuitry element includes a bonded foil strain gauge.

9. The pulley hub load cell as defined in claim 6, wherein said at least one strain gauge and electronic circuitry element are capable of sensing shear strain.

10. The pulley hub load cell as defined in claim 6, wherein said at least one strain gauge and electronic circuitry element are capable of sensing bending strain.

11. The pulley hub load cell as defined in claim 6, wherein said at least one strain gauge and electronic circuitry element are adhered to said body.

12. The pulley hub load cell as defined in claim 6, wherein said at least one strain gauge and electronic circuitry element are affixed to outside of said body.

13. The pulley hub load cell as defined in claim 6, wherein said at least one strain gauge and electronic circuitry element are affixed to inside said interior bore of said body.

14. A pulley hub load cell assembled inside a hub opening of a pulley between a rolling element part and a pulley axle, comprising:
   a. a body adapted to be placed inside said rolling element part and having an interior bore for insertion there-through said pulley axle;
   b. said body having at least one exterior location to be brought into contact with said rolling element part, and at least one interior location to be brought into contact with said pulley axle;
   c. said at least one exterior location and said at least one interior location of said body being spaced apart and offset such that a portion of said body there-between forms a cantilever configuration which is deformable when counter-loads are applied to said at least one exterior location and said at least one interior location of said body from said rolling element part and said pulley axle respectively; and d. a strain gauge element affixed to said cantilever portion of said body for producing a load sensing signal in proportion to said counter-loads applied to said body.

15. The pulley hub load cell as defined in claim 14, wherein said body has a generally hollow cylindrical shaped configuration.

16. The pulley hub load cell as defined in claim 14, wherein said at least one exterior location is a central section of said body.

17. The pulley hub load cell as defined in claim 16, wherein said at least one interior location is an interior flange at one end of said interior bore of said body.

18. The pulley hub load cell as defined in claim 17, wherein said at least one interior location also includes is an interior flange at an opposite end of said interior bore of said body.

19. The pulley hub load cell as defined in claim 14, wherein said cantilever portion of said body has a reduced thickness.

20. The pulley hub load cell as defined in claim 14, wherein said strain gauge element is a bonded foil strain gauge.

21. The pulley hub load cell as defined in claim 14, wherein said strain gauge element is capable of sensing shear strain.

22. The pulley hub load cell as defined in claim 14, wherein said strain gauge element is capable of sensing bending strain.

23. The pulley hub load cell as defined in claim 14, wherein said strain gauge element is adhered to said body.

24. The pulley hub cell as defined in claim 14, wherein said strain gauge element is affixed to outside of said body.

25. The pulley hub cell as defined in claim 14, wherein said strain gauge element is affixed to inside said interior bore of said body.

26. The pulley hub load cell as defined in claim 14 further comprising electronic circuitry component for processing and outputting of said load sensing signal.

27. The pulley hub cell as defined in claim 14 further comprising at least one generally sleeve shaped cover for protecting said body.

\* \* \* \* \*